Feb. 9, 1926.
C. E. BLECKSMITH
RETHREADING TOOL
Filed May 22, 1924
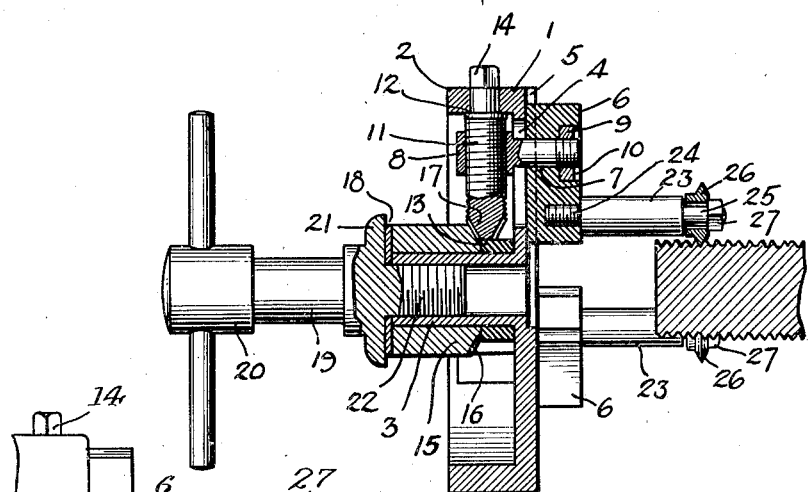
Fig. 1.
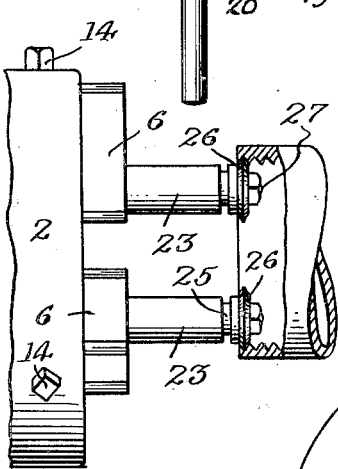
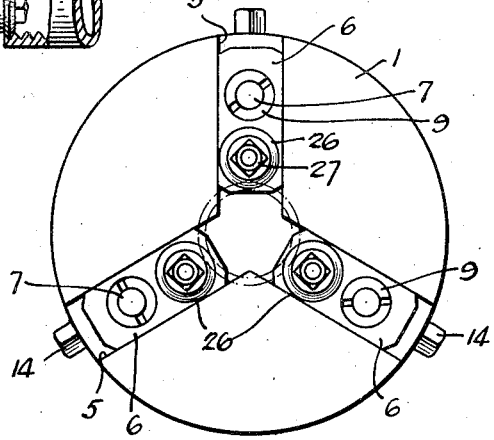
Fig. 2.
Fig. 3.
Inventor
CHARLES E. BLECKSMITH
Attorney Patented Feb. 9, 1926.

1,572,064

UNITED STATES PATENT OFFICE.

CHARLES E. BLECKSMITH, OF LOS ANGELES, CALIFORNIA.

RETHREADING TOOL.

Application filed May 22, 1924. Serial No. 715,020.

*To all whom it may concern:*

Be it known that I, CHARLES E. BLECK-SMITH, a citizen of the United States, residing at Los Angeles, in the county of Los Angeles and State of California, have invented certain new and useful Improvements in Rethreading Tools, of which the following is a specification.

This invention is a tool for recutting worn or mashed threads, either male or female, and it is the object of the invention to provide a simple but durable tool which may be readily operated, and which will recut threads of various diameter and of different pitch.

More particularly it is the object of the invention to provide a tool chuck having cutters adapted to engage the work which is to be rethreaded, the chuck having a handle whereby it may be oscillated on the work, and the cutters being mounted so as to exactly follow the grooves of the worn threads for recutting the same.

It is a further object of the invention to provide for varying the diameter of the circumference described by the cutters through a relatively wide range of adjustment, and to so mount the cutters that they may be inserted in a piece of work or overlie the same for cutting either female or male threads.

It is a still further object of the invention to provide simplified means for radially adjusting the cutters, preferably including a construction whereby said cutters may be simultaneously and equally shifted so as to maintain a true circumference.

The invention will be readily understood from the following description of the accompanying drawings, in which:

Fig. 1 is an axial section through a tool constructed in accordance with the invention and mounted in position for recutting male threads.

Fig. 2 is a front elevation of the same.

Fig. 3 is a fragmentary side elevation of the tool, showing the same in position for re-cutting female threads.

The tool comprises a chuck shown as a disc 1 having a peripheral flange 2 and an axial boss 3 projecting rearwardly therefrom, said disc having radial slots 4 extending therethrough at circumferentially spaced points, with the ends of said slots spaced from the periphery and the center of said disc.

The front surface of the disc is provided with radial grooves 5 in alinement with slots 4 and extending from the center to the periphery of the disc. Elongated blocks 6 are slidably mounted in grooves 5 and are held in place by bolts 7 extending through said blocks and slots 4, with the heads 8 of the bolts abutting against the rear surface of disc 1 at the sides of slots 4, and nuts 9 which are threaded onto said bolts, received in recesses 10 formed in the outer surfaces of blocks 6. The blocks are thus adapted for radial adjustment relative to disc 1 by radial shifting of bolt heads 8.

Screws 11 extend radially of disc 1 at the rear surface thereof, the threaded medial portions of said screws being threaded through bolt heads 8, and the outer ends of said screws extending through flange 2 and being adapted for free rotation therein.

Shoulders 12 on said screws engage the inner surface of flange 2, and the inner ends of the screws abut against a thrust collar 13 mounted on boss 3. Heads 14 on the outer ends of the screws beyond flange 2 are adapted to be engaged by a suitable tool for turning the same, and since the screws are held against axial movement, said turning movement will thread bolt heads 8 back and forth for radially adjusting blocks 6.

In order to provide for simultaneous and equal radial adjustment of the blocks by turning any one of the screw heads 14, a sleeve 15 having a bevel gear 16 at the inner end thereof is journaled on boss 3 beyond thrust collar 13 and meshes with bevel gears 17 at the inner ends of screws 11, so that turning any one of said screws will rotate all of the same through the gear connection.

A washer 18 is preferably mounted on the end of boss 3 beyond gear sleeve 15, and a handle projecting rearwardly from the chuck is detachably secured to said boss. The handle comprises a shank 19 having a cross handle 20 at its rear end, and an enlargement 21 at its front end adapted to overlie washer 18, with an axial stud 22 projecting from said enlargement and detachably secured in an axial, threaded recess in the end of boss 3.

The bolts 7 preferably engage blocks 6 adjacent one end thereof, and arms 23 are mounted on the opposite ends of said blocks, as by means of studs 24 projecting from said arms and threaded into the blocks, said arms extending axially forward from the chuck in circumferentially spaced relation.

The blocks 6 being detachable from bolts 7 by removing nuts 9, the position of the blocks in grooves 5 may be readily radially reversed, so that the diameter of the circumference described by arms 23 may be made relatively large or small, to adapt the tool for use with threads of a wide range in diameter, it being understood that after blocks 6 are fixed relative to bolts 7, close adjustment of arms 23 may be made by turning operating screws 11 so as to radially shift the blocks and arms carried thereby, as previously described.

Bearing studs 25 project axially from the outer ends of arms 23, and cutter discs 26 are journaled on said studs and held in position by nuts 27 threaded onto the outer ends of the same. The cutter discs are arranged for limited axial and radial movement on the bearing studs, so that said discs are free for slight wabbling movement, and the cutting edges of said discs are adapted to fit the grooves of usual threads.

In operation, arms 23 are radially adjusted so that cutter discs 26 snugly engage the grooves of the threads to be recut, the arms extending along the exterior of the work as shown in Fig. 1, when a male thread is to be rethreaded, or extending into the bore of the work when the latter has a female thread.

The cutter discs being adapted for slight wabbling movement as well as slight axial shifting thereof, will readily conform to the pitch of the worn threads, so that by holding the work against rotation and rotating the chuck by turning handle 20, the cutter discs will revolve around the work and follow the grooves of the threads, and the discs will also rotate on arms 23 for recutting said threads.

As the rethreading progresses, the radial adjustment of the cutter discs may be regulated as found necessary, by turning one of the screw heads 14, and the rethreading operation may be continued along the length of the threads by progressive turning of the chuck relative to the work.

It will be apparent that various changes may be made in the construction, combination, and arrangement of parts as thus described, without departing from the spirit of the invention.

I claim:

1. A rethreading tool comprising a chuck having a projecting boss, a handle fixed to the boss for turning the chuck, a rotatable member on the boss, screws held against longitudinal movement extending radially of the chuck in circumferentially spaced relation, gearing between said rotatable member and said screws for dependent turning of said screws, bolts threaded on said screws for equi-distant radial adjustment of said bolts by turning anyone of said screws, elongated blocks extending radially of said chuck and adapted for mounting on said bolts adjacent one end of the blocks whereby the blocks may be reversed for inward or outward projection of the opposite end of the blocks, arms projecting from said opposite end of the blocks, and cutter discs rotatably mounted on said arms and insertable in the bore or receivable over the end of a piece of work by radial adjustment of the blocks so that said cutter discs engage interior or exterior threads of the work at opposite sides of the cutter discs and at circumferentially spaced points, said cutter discs being free for limited wabbling movement on the arms to permit said cutter discs to follow the pitch of the threads of the piece of work when the chuck is rotated relative thereto.

2. A rethreading tool comprising a chuck having a projecting boss, a handle fixed to the boss for turning the chuck, a rotatable member on the boss, screws held against longitudinal movement extending radially of the chuck in circumferentially spaced relation, gearing between said rotatable member and said screws for dependent turning of said screws, bolts threaded on said screws for equi-distant radial adjustment of said bolts by turning anyone of said screws, elongated blocks extending radially of said chuck and adapted for mounting on said bolts adjacent one end of the blocks whereby the blocks may be reversed for inward or outward projection of the opposite end of the blocks, arms projecting from said opposite end of the blocks, and cutter discs rotatably mounted on said arms and insertable in the bore or receivable over the end of a piece of work by radial adjustment of the blocks so that said cutter discs engage interior or exterior threads of the work at opposite sides of the cutter discs and at circumferentially spaced points.

3. A rethreading tool comprising a chuck, screws held against longitudinal movement extending radially of the chuck in circumferentially separated relation, means for dependently turning said screws, bolts threaded on said screws for equi-distant radial adjustment of said bolts by turning anyone of said screws, elongated blocks extending radially of said chuck and adapted for mounting on said bolts adjacent one end of the blocks whereby the blocks may be reversed for inward or outward projection of the opposite end of the blocks, arms projecting from said opposite end of the blocks, and cutter discs rotatably mounted on said arms and insertable in the bore or receivable over the end of a piece of work by radial adjustment of the blocks so that said cutter discs engage interior or exterior threads of the work at opposite sides of the cutter discs and at circumferentially spaced points.

In testimony whereof I have affixed my signature to this specification.

CHARLES E. BLECKSMITH.